US009430341B2

(12) United States Patent
Balogh et al.

(10) Patent No.: US 9,430,341 B2
(45) Date of Patent: Aug. 30, 2016

(54) FAILOVER IN A DATA CENTER THAT INCLUDES A MULTI-DENSITY SERVER

(71) Applicant: International Business Machines Corporation, Armonk, NY (US)

(72) Inventors: Nicholas J. Balogh, Raleigh, NC (US); Albert D. Bennah, Cary, NC (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 14/087,130

(22) Filed: Nov. 22, 2013

(65) Prior Publication Data

US 2015/0143159 A1    May 21, 2015

Related U.S. Application Data

(63) Continuation of application No. 14/083,539, filed on Nov. 19, 2013, now Pat. No. 9,262,286.

(51) Int. Cl.
*G06F 11/20* (2006.01)

(52) U.S. Cl.
CPC ......... *G06F 11/2007* (2013.01); *G06F 11/203* (2013.01); *G06F 11/2035* (2013.01); *G06F 11/2046* (2013.01)

(58) Field of Classification Search
CPC .......... G06F 11/2007; G06F 11/2005; G06F 11/2038; G06F 11/2028; G06F 11/0709; G06F 11/20; G06F 11/0793; G06F 11/2097; G06F 11/2069; G06F 11/2023
See application file for complete search history.

(56) References Cited

U.S. PATENT DOCUMENTS

| 6,978,398 | B2 | 12/2005 | Harper et al. |
| 7,069,465 | B2 * | 6/2006 | Chu ................... G06F 11/2092 714/6.22 |
| 7,613,808 | B2 | 11/2009 | Ferreira Araujo et al. |

(Continued)

FOREIGN PATENT DOCUMENTS

| WO | WO 2007/064637 A2 | 6/2007 |
| WO | WO 2011/146883 A2 | 11/2011 |

OTHER PUBLICATIONS

Zhou, Y., et al., "Fast Cluster Failover Using Virtual Memory-Mapped Communication," ICS '99 Proceedings of the 13th International Conference on Supercomputing, Jun. 20-25, 1999, pp. 373-382, ACM, New York, NY, USA. DOI: 10.1145/305138. 305215.

(Continued)

*Primary Examiner* — Nadeem Iqbal
(74) *Attorney, Agent, or Firm* — Brandon C. Kennedy; Grant A. Johnson; Kennedy Lenart Spraggins LLP

(57) ABSTRACT

Failover in a data center that includes a multi-density server, where the multi-density server includes multiple independent servers, includes; detecting, by a management module, a failure of one of the independent servers of the multi-density server; identifying, by the management module, a failover target; determining, by the management module, whether the failover target is a non-failed independent server included in the multi-density server; and responsive to determining that the failover target is a non-failed independent server included in the multi-density server, migrating, by the management module, the failed independent server's workload to another server that is not included in the multi-density server.

5 Claims, 6 Drawing Sheets

(56) References Cited

U.S. PATENT DOCUMENTS

| | | | | |
|---|---|---|---|---|
| 7,802,128 | B2* | 9/2010 | Dasari | G06F 11/1482 714/10 |
| 8,464,092 | B1* | 6/2013 | Gentes | G06F 11/1438 709/245 |
| 2006/0015773 | A1* | 1/2006 | Singh | G06F 11/2046 714/13 |
| 2011/0145631 | A1* | 6/2011 | Shankar | G06F 11/0709 714/4.11 |
| 2012/0017102 | A1 | 1/2012 | Turicchi, Jr. et al. | |
| 2012/0096458 | A1 | 4/2012 | Huang et al. | |
| 2013/0198739 | A1* | 8/2013 | Razdan | G06F 9/45558 718/1 |
| 2015/0058659 | A1* | 2/2015 | Brundridge | G06F 11/2025 714/4.11 |

OTHER PUBLICATIONS

Zhang, R., et al., "Efficient TCP Connection Failover in Web Server Clusters," INFOCOM 2004. Twenty-third AnnualJoint Conference of the IEEE Computer and Communications Societies, Mar. 7-11, 2004, pp. 1219-1228, vol. 2, IEEE Computer Society, Washington, DC, USA, DOI: 10.1109/INFCOM.2004.1357008.

"Fault Tolerance Error Messages", vmware.com (online), vSphere 4.0—ESX and vCenter, vSphere Availability Guide, Appendixes, 3 pages, [accessed Jul. 12, 2013], URL: http://pubs.vmware.com/vsphere-4-esx-vcenter/index.jsp?topic=/com.vmware.vsphere.availability.doc_40/r_ft_errors.html.

"VMware Fault Tolerance Recommendations and Considerations on VMware vSphere™ 4", vmware.com (online), 16 pages, [Accessed Jul. 12, 2013], URL: http://www.vmware.com/files/pdf/fault_tolerance_recommendations_considerations_on_vmw_vsphere4.pdf.

"Avoid running VM's on the same host using Anti-Affinity", microsoct.com (online), Windows Server Forum—High Availability (Clustering), 3 pages, [accessed Jul. 12, 2013], URL: http://social.technet.microsoft.com/Forums/en-US/winserverClustering/thread/d0efc5ed-2de4-4cae-a1c2-86b12ab4841e/.

Shields, G., "Need to Separate Hyper-V VMs? Use AntiAffinityClassName", Windows® ITPro Virtualization Pro Tips Blog, windowsitpro.com (online), May 12, 2010 [Accessed Jul. 12, 2013], 2 pages, URL: http://windowsitpro.com/blog/need-separate-hyper-v-vms-use-antiaffinityclassname.

Savill, J., "Q. How are virtual machines (VMs) failed over between nodes in a Windows Server 2008 failover cluster?", Windows® ITPro Windows Question, windowsitpro.com (online), Jan. 17, 2009 [Accessed Jul. 12, 2013], 3 pages, URL: http://windowsitpro.com/windows/q-how-are-virtual-machines-vms-failed-over-be-tween-nodes-windows-server-2008-failover-cluster.

Denneman, F., "VM to Hosts affinity rule", frankdenneman.nl(online), blog, Jul. 16, 2010, [accessed Jul. 12, 2013], 6 pages, URL: http://frankdenneman.nl/2010/07/16/vm-to-hosts-affinity-rule/.

Wyatt, D., et al., "Inferring Colocation and Conversation Networks from Privacy-Sensitive Audio with Implications for Computational Social Science", ACM Transactions on Intelligent Systems and Technology, Jan. 2011, pp. 1-41, vol. 2, No. 1, Article 7, ACM, Inc., New York, N.Y., USA, URL: http://www.cs.cornell.edu/~tanzeem/pubs/tist_colocation.pdf.

Wikipedia, "Complex event processing", en.wikipedia.org (online), [accessed Jul. 12, 2013], 2 pages, URL: http://en.wikipedia.org/wiki/Complex_event_processing.

Huang, Y., et al., "Discovering Co-location Patterns from Spatial Datasets: A General Approach", IEEE Transactions on Knowledge and Data Engineering, Dec. 2004, pp. 1-30, vol. 16, Issue: 12, IEEE Computer Society, Washington, DC, USA, URL: http://www.spatial.cs.umn.edu/paper_ps/coloc-tkde.pdf.

* cited by examiner

FAILOVER IN A DATA CENTER THAT INCLUDES A MULTI-DENSITY SERVER

CROSS-REFERENCE TO RELATED APPLICATION

This application is a continuation application of and claims priority from U.S. patent application Ser. No. 14/083, 539, filed on Nov. 19, 2013.

BACKGROUND OF THE INVENTION

1. Field of the Invention

The field of the invention is data processing, or, more specifically, methods, apparatus, and products for failover in a data center that includes a multi-density server.

2. Description of Related Art

In data centers today, a server having a single rack space form factor may, in fact, house many independent servers. Such a server is referred to as a multi-density server. While independent servers may share some resources of the multi-density server, independent servers within the same multi-density server may each include separate central processing units (CPUs), separate primary memories, separate communications adapters, separate local power supplies, and so on. Each independent server may execute a separate and independent operation system and different workloads. Other servers in the data center may interact with each independent server as if the independent server was a server in a single rack space form factor. That is, the physical housing of the independent server does not factor into another servers interaction with the independent server.

Problems occur, however, in migration for purposes of high availability and failover. Migration due to failover is often carried out with respect to physical affinity. A workload executing on a first server is often migrated, during failover, to the physically closest available server. In multi-density servers, however, a failure of one independent server often leads, due to the affinity algorithms, to migrating the failing independent server's workload to another independent server of the same multi-density server. Failures, however, in an independent server often require the entire multi-density server (including all independent servers) to be taken off-line for repair. Also, a single failure detected in one independent server may find be caused by resource failure of the multi-density server that are shared amongst all independent server. As such, a failure of one independent server represents higher probability of failure in another independent server in the same multi-density server than a failure in another server housing altogether. In each of these examples, migration of workload from one independent server to another within the same multi-density server is inefficient and may possibly result in failure to provide high availability.

SUMMARY OF THE INVENTION

Methods, apparatus, and products for failover in a data center comprising a multi-density server are disclosed in this specification. The multi-density server includes a plurality of independent servers. Failover in such a data center includes: detecting, by a management module, a failure of one of the independent servers of the multi-density server; identifying, by the management module, a failover target; determining, by the management module, whether the failover target is a non-failed independent server included in the multi-density server; and, responsive to determining that the failover target is a non-failed independent server included in the multi-density server, migrating, by the management module, the failed independent server's workload to another server that is not included in the multi-density server. The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
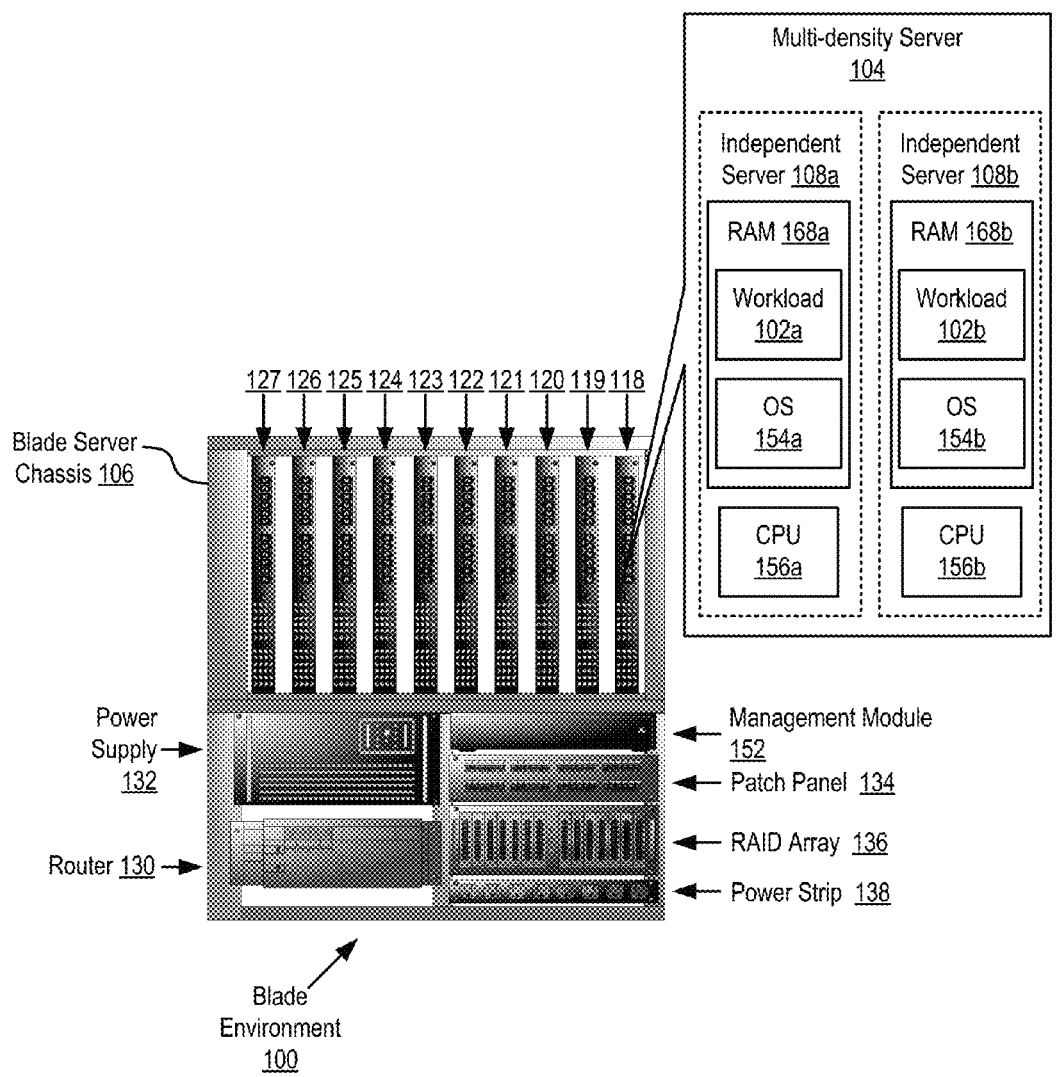
FIG. 1 sets forth a functional block diagram of an exemplary data center than includes a blade environment configured for server failover according to embodiments of the present invention.

Exemplary methods, apparatus, and products for failover in a data center that includes a multi-density server in accordance with the present invention are described with reference to the accompanying drawings, beginning with FIG. 1. FIG. 1 sets forth a functional block diagram of an exemplary data center than includes a blade environment (100) configured for server failover according to embodiments of the present invention. Examples of such blade environments may include the Blade System from HP, the BladeCenter® from IBM, and others as will occur to those of skill in the art.

The blade environment (100) in the example of FIG. 1 includes a blade server chassis (106) housing a number of blade servers (118-127). Blade servers (118-127) are installed in blade server chassis (106). A blade server chassis is an enclosure in which blade servers as well as other electrical components are installed. The chassis provides cooling for servers, data communications networking connections, input/output device connections, power connections, and so on as will occur to those of skill in the art. One example blade server chassis is IBM's BladeCenter. An IBM BladeCenter E includes 14 blade slots, a shared media tray with an optical drive, floppy drive, and Universal Serial Bus ('USB') port, one or more management modules, two or more power supplies, two redundant high speed blowers, two slots for Gigabit Ethernet switches, and two slots for optional switch or pass-through modules such as Ethernet, Fibre Channel, InfiniBand or Myrient 2000 modules.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade server chassis (DC power) virtualized (iSCSI storage, remote console over IP), or discarded entirely (serial ports). The blade itself becomes simpler, smaller, and amenable to dense installation with many blade servers in a single blade server chassis.

In the example of FIG. 1, at least one of the blade servers (118) is a multi-density server (104). A multi-density server is a server housing typically configured to include hardware for only a single server, but actually including a plurality of independent servers. That is, a multi-density server may include computer hardware that supports two or more independent servers, while the computer hardware is actually stored in a single server's housing. For example, a multi-density server may be of a single rack unit (IU) form factor configured for installation in a single slot of a server chassis. One example of a multi-density server configured in a single rack unit housing is a blade server. Such a form factor typically contains computer hardware that supports only a single independent server. A multi-density server, by contrast, may include computer hardware that supports multiple independent servers (108a, 108b). Such computer hardware may include one set of primary memory, such as Random Access Memory (RAM) (168a, 168b), for each independent server, one CPU (156a, 156b) for each independent server, separate communications adapters and communications ports for each independent server, and the like. Each independent server (108a, 108b) in the example multi-density server (104) of FIG. 1 is executing a workload (102a, 102b). The multi-density server may also include some computer hardware that, unbeknownst to each independent server's operating system (156a, 156b) is actually shared between the independent servers. A virtual machine is not an independent server as the term is used in this specification. Computer hardware that supports execution of a virtual machine is, in fact, virtualized to some extent while an independent server relates to non-virtualized hardware that is independent of another server's hardware within the same housing. Effectively, two or more computers with all computer hardware forming each computer are included inside a single housing of a multi-density server which is normally configured to include only a single computer's hardware.

In addition to the blade servers (109-127), the blade server chassis (104, 106) in the example of FIG. 1 also house several other electrical components including a power supply (132), a data communications router (130), a patch panel (134) a RAID array (136), a power strip (138) and a management module (152).

A management module is an aggregation of computer hardware and software that is installed in a data center to provide support services for computing devices, such as blade servers. Support services provided by the management module (152) include monitoring health of computing devices and reporting health statistics to a system management server, power management and power control, save and restore configurations, discovery of available computing devices, event log management, memory management, and so on. An example of a management module that can be adapted for use in systems configured for server failover according to embodiments of the present invention is IBM's Advanced Management Module ('AMM'). The management module in the example of FIG. 1 may be configured to carry out server failover according to embodiments of the present invention by detecting a failure of one of the independent servers, such as independent server (108a), of the multi-density server (104). The management module (152) typically is unaware that such a server is in fact a member of a multi-density server as each independent server may be configured with separate, independent communications adapters which may be utilized to identify separate servers.

Responsive to the detection of failure, the management module (152) may identify a failover target. A failover target as the term is used in this specification is a server or other computer to which a workload may be moved from a failing server. In embodiments in which the management module (152) identifies failover targets based on physical affinity, the management module (152) may identify as a failover target, another independent server within the same multi-density server as the failing independent server.

To that end, the management module (152) may be further configured to determine whether the failover target is a non-failed independent server (108b) included in the multi-density server (104). There are a variety of ways for the management module (152) to determine whether the failover target is another independent server within the multi-density server (104). Many of these ways are described below in greater detail with respect to FIG. 6.

Responsive to determining that the failover target is a non-failed independent server (108b) included in the multi-density server, the management module (152) may migrate the failed independent server's workload to another server (119-127) that is not included in the multi-density server. In this way, the management module insures that any workload migrated away from a failing server is not migrated to another independent server within the same multi-density server (104).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Failover in a data center that includes a multi-density server in accordance with the present invention is generally implemented with computers, that is, with automated computing machinery. In the system of FIG. 1, for example, all the blade servers, multi-density servers, and management module are implemented to some extent at least as computers. For further explanation, therefore, FIG. 2 sets forth a block diagram of automated computing machinery comprising an exemplary computer in the form of a management module (152) useful for failover in a data center that includes a multi-density server according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a management module application (153), a module of computer program instructions that, when executed, causes the management module (152) to operate for failover in a data center that includes a multi-density server (104) according to embodiments of the present invention. The example multi-density server (104) of FIG. 2 includes a plurality of independent servers (108a, 108b) and each is executing a separate workload (102a, 102b).

The management module application (153) may carry out failover according to embodiments of the present invention by detecting a failure of one of the independent servers (108a) of the multi-density server (104); identifying a failover target; determining whether the failover target is a non-failed independent server (108b in this example) included in the multi-density server (104); and, responsive to determining that the failover target is a non-failed independent server (108b) included in the multi-density server (104), migrating the failed independent server's workload (102a) to another server (182) that is not included in the multi-density server (104).

Also stored in RAM (168) is an operating system (154). Operating systems useful in management modules configured for failover in a data center that includes a multi-density server according to embodiments of the present invention include UNIX™, Linux™, Microsoft XP™, AIX™, IBM's i5/OS™, and others as will occur to those of skill in the art. The operating system (154) and management module application (153) in the example of FIG. 2 are shown in RAM (168), but many components of such software typically are stored in non-volatile memory also, such as, for example, on a disk drive (170).

Figure 2:
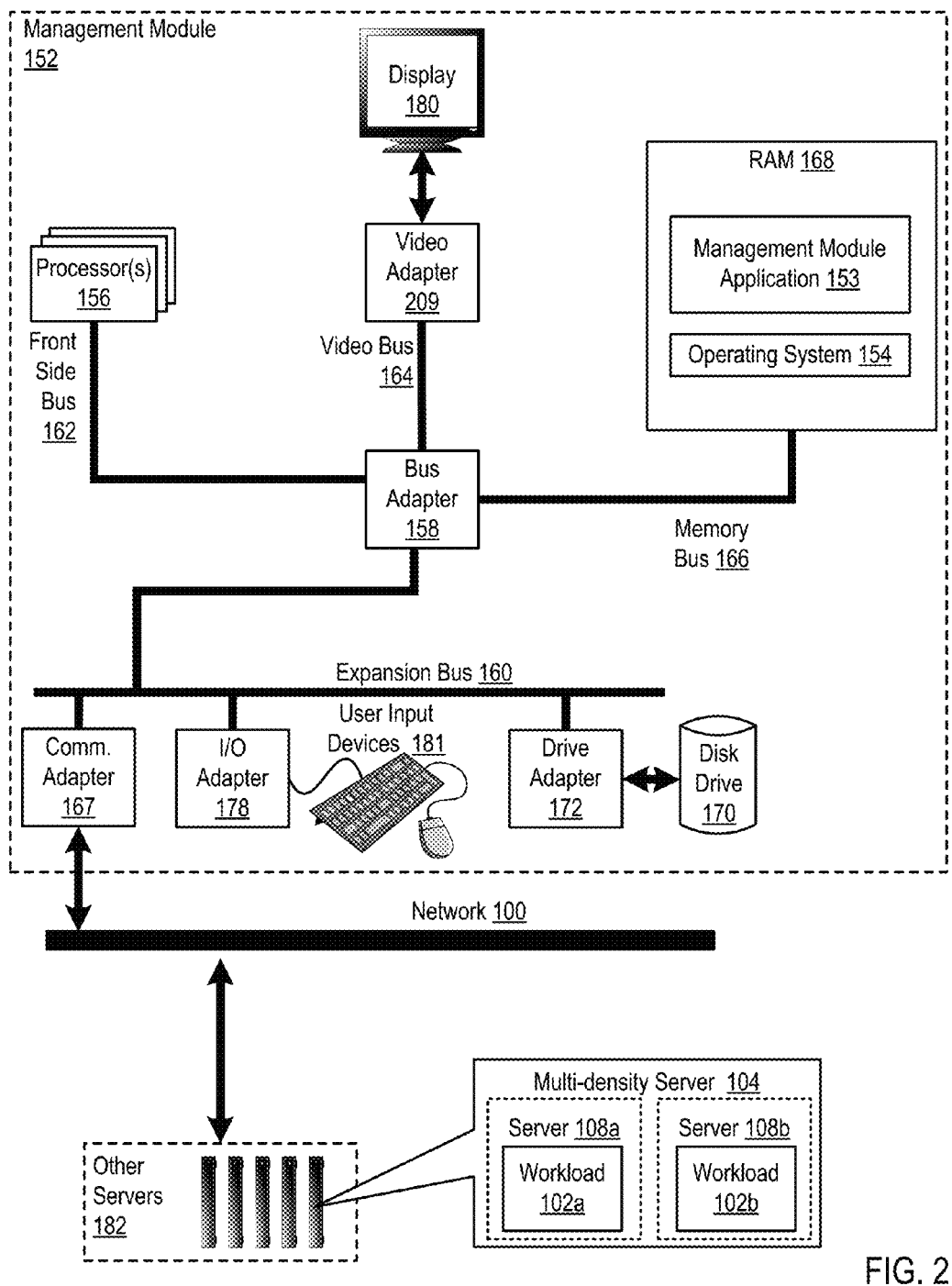
FIG. 2 sets forth a block diagram of automated computing machinery comprising an exemplary computer in the form of a management module useful for failover in a data center that includes a multi-density server according to embodiments of the present invention.

The management module (152) of FIG. 2 includes disk drive adapter (172) coupled through expansion bus (160) and bus adapter (158) to processor (156) and other components of the management module (152). Disk drive adapter (172) connects non-volatile data storage to the management module (152) in the form of disk drive (170). Disk drive adapters useful in management modules configured for failover in a data center that includes a multi-density server according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management module (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example management module (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary management module (152) of FIG. 2 includes a communications adapter (167) for data communications with other servers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in management modules configured for failover in a data center that includes a multi-density server according to embodiments of the present invention include modems for wired dial-up communications, Ethernet (IEEE 802.3) adapters for wired data communications, and 802.11 adapters for wireless data communications.

Figure 3:
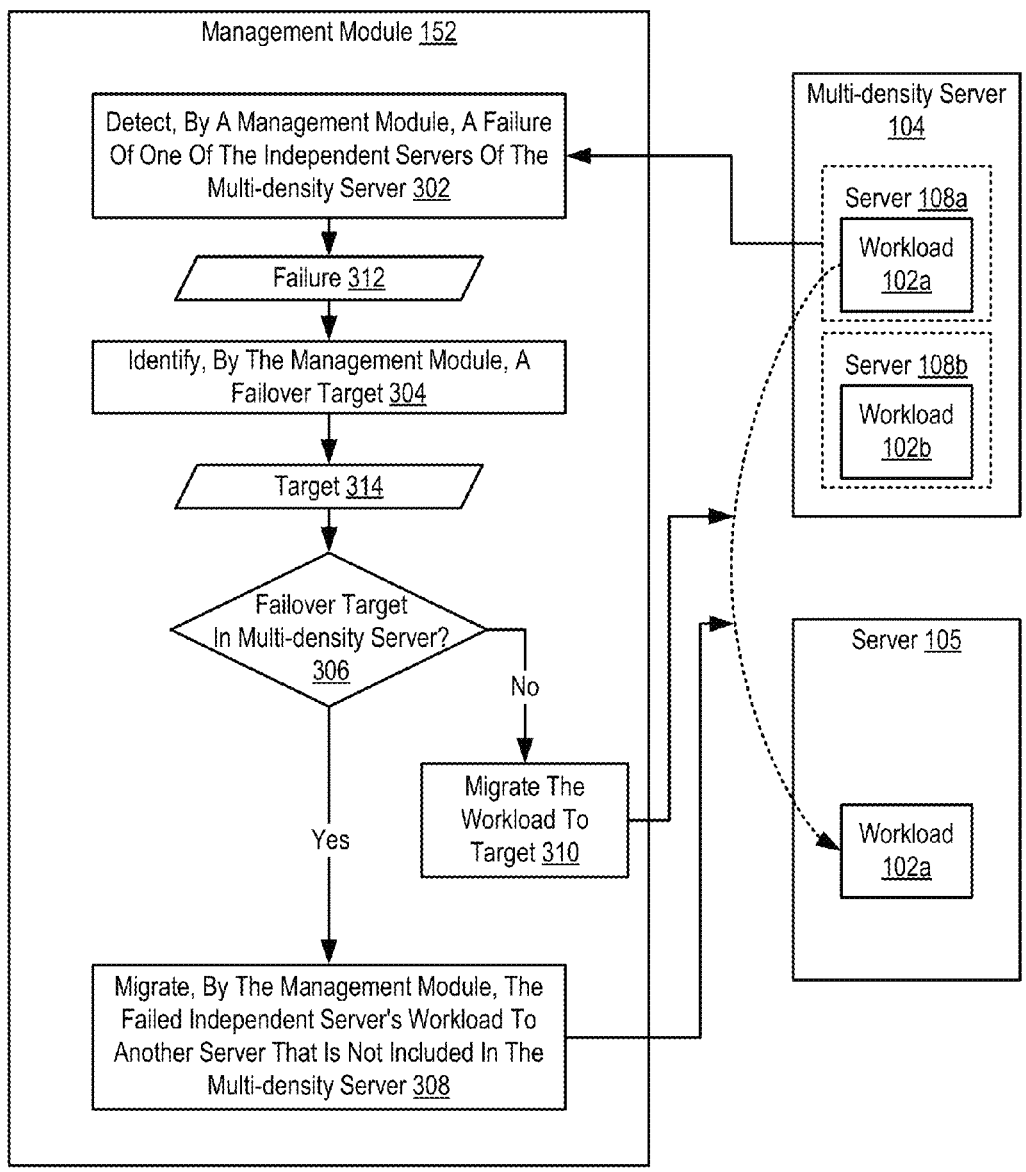
FIG. 3 sets forth a flow chart illustrating an exemplary method for failover in a data center that includes a multi-density server according to embodiments of the present invention.

For further explanation, FIG. 3 sets forth a flow chart illustrating an exemplary method for failover in a data center that includes a multi-density server according to embodiments of the present invention. The method of FIG. 3 may be carried out in a data center similar to that of FIG. 1 which includes a multi-density server similar to that of FIG. 2. The multi-density server (104) includes a plurality of independent servers (108a, 108b).

The method of FIG. 3 includes detecting (302), by a management module (152), a failure (312) of one of the independent servers (108a) of the multi-density server (104). Detecting (302) a failure (312) of one of the independent servers (108a) of the multi-density server (104) may be carried out in variety of ways. The management module (152) may receive a notification via an out-of-band bus from a service processor, such as a baseboard management controller (BMC), dedicated to the independent server that indicates a failure. Such an indication of failure may be an indication of an actual or possible failure. The management module (152) may also periodically ping the operating system of the independent server to check the status of the server. An indication of a failure may be result if a ping is not answered or if the ping is answered with such a failure notification. Readers of skill in the art will recognize that there are many ways to detect a failure of a server and each such way is well within the scope of embodiments of the present invention.

The method of FIG. 3 also includes identifying (304), by the management module (152), a failover target (314). Identifying (304) a failover target (314) may be carried out by identifying a server physically proximate to the failing server and available to received migrated workloads. In some embodiments, such a server may be designated in a pool of available failover targets.

The method of FIG. 3 also includes determining (306), by the management module (152), whether the failover target (314) is a non-failed independent server (108b) included in the multi-density server (104). Determining (306) whether the failover target (314) is a non-failed independent server (108b) included in the multi-density server (104) may be carried out in various ways, many of which are described below in greater detail with respect to FIG. 6.

If the failover target (314) is not a non-failed independent server (108b) included in the multi-density server (104), the method of FIG. 3 continues by migrating (310), by the management module (152), the failed independent server's (108a) workload (102a) to another server (105) that is not included in the multi-density server (104). If, however, the failover target (312) is a non-failed independent server (108b) included in the multi-density server (104), the method of FIG. 3 continues by migrating (308), by the management module (152), the failed independent server's (108a) workload (102a) to another server (105) that is not included in the multi-density server (104). That is, the management module (152) selects a server that is not included in the multi-density server as a target for the failover. The management module (152) again may utilize an affinity algorithm or criteria in determining which target, not included in the multi-density server, to select before migrating the workload.

Figure 4:
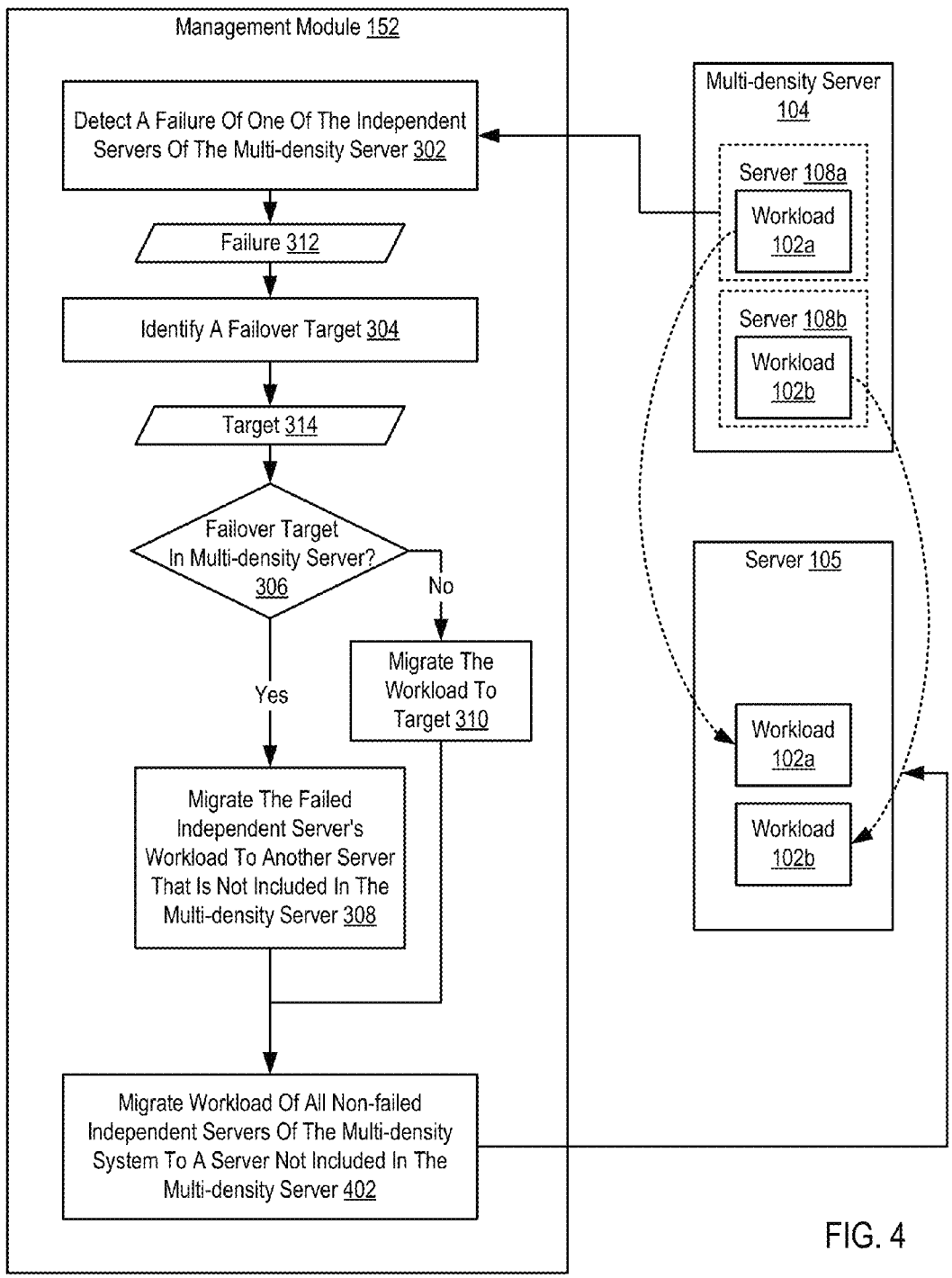
FIG. 4 sets forth a flow chart illustrating an exemplary method for failover in a data center that includes a multi-density server according to embodiments of the present invention.

For further explanation, FIG. 4 sets forth a flow chart illustrating an exemplary method for failover in a data center that includes a multi-density server according to embodiments of the present invention. The method of FIG. 4 may be carried out in a data center similar to that of FIG. 1 which includes a multi-density server similar to that of FIG. 2. The multi-density server (104) includes a plurality of independent servers (108a, 108b). The method of FIG. 4 is similar to the method of FIG. 3 in that the method of FIG. 4 includes detecting (302) a failure (312) of one of the independent servers (108a) of the multi-density server (104), identifying (304) a failover target (314), determining (306) whether the failover target (314) is a non-failed independent server (108b) included in the multi-density server (104), and if the failover target (312) is a non-failed independent server (108b) included in the multi-density server (104), migrating (308) the failed independent server's (108a) workload (102a) to another server (105) that is not included in the multi-density server (104).

The method of FIG. 4 differs from the method of FIG. 3, however, in that while or after migrating (308) the failed independent server's workload (102a), the method of FIG. 4 includes by migrating (402), by the management module (152), workload of all non-failed independent servers (108b) of the multi-density system (104) to a server (105) not included in the multi-density server. Once one independent server of a multi-density server has failed, it may be necessary to take the entire multi-density server offline for maintenance or repair. To that end, rather than waiting until a request from a system administrator, the management module may preemptively migrate (402) workloads (102b) of all non-failed independent servers to another server that is not included in the multi-density server. In other embodiments, a failure of one independent server may be indicative of a failure in the multi-density server itself, in the hardware of the server rack that supports the multi-density server, or in some other way related to the multi-density server as a whole. In this way, the management module may be configured migrate (308, 402) all workload from all independent servers of the multi-density server to another server once a failure from just one of the independent servers is detected.

Figure 5:
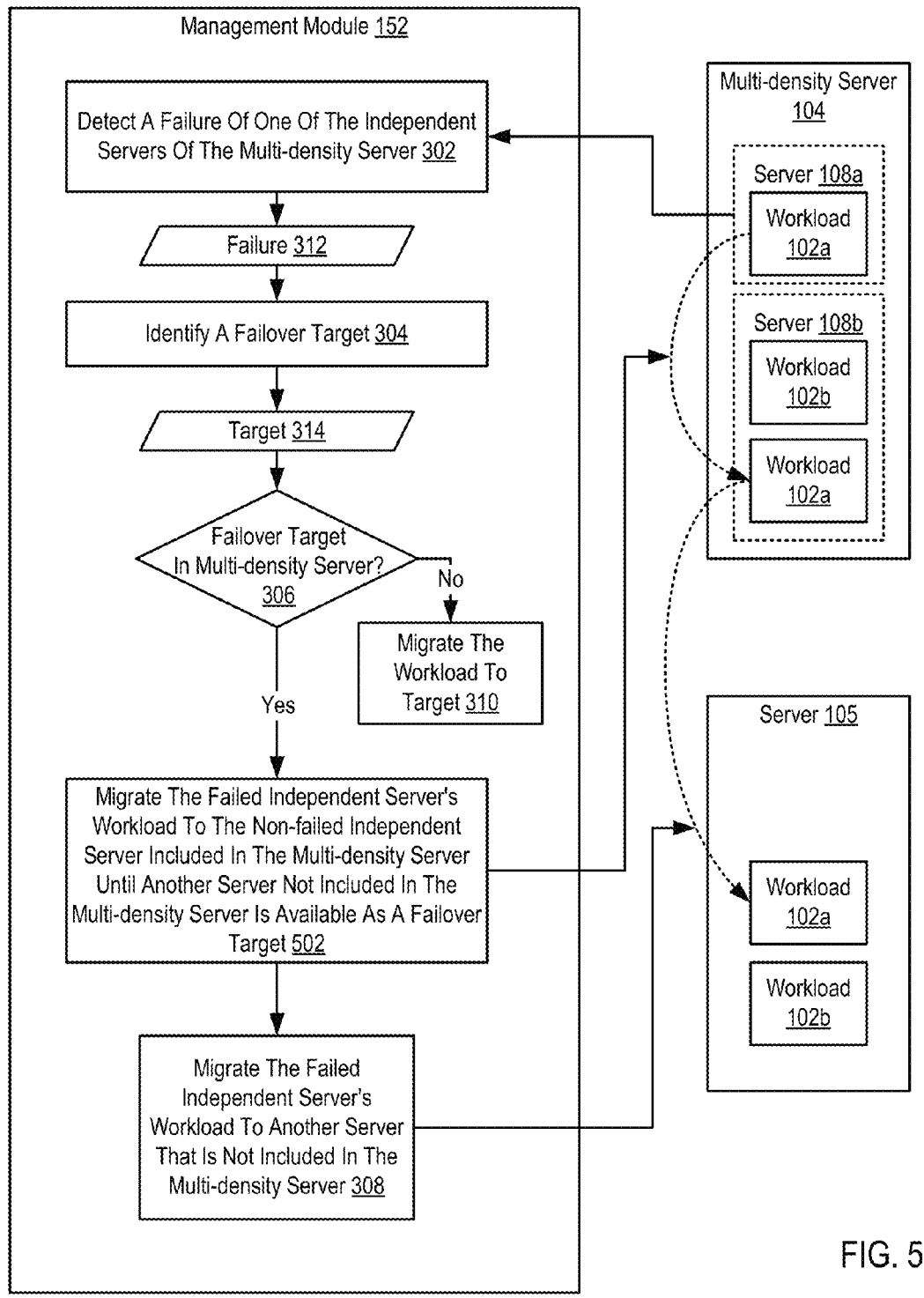
FIG. 5 sets forth a flow chart illustrating an exemplary method for failover in a data center that includes a multi-density server according to embodiments of the present invention.

For further explanation, FIG. 5 sets forth a flow chart illustrating an exemplary method for failover in a data center that includes a multi-density server according to embodiments of the present invention. The method of FIG. 5 may be carried out in a data center similar to that of FIG. 1 which includes a multi-density server similar to that of FIG. 2. The multi-density server (104) includes a plurality of independent servers (108a, 108b). The method of FIG. 5 is similar to the method of FIG. 3 in that the method of FIG. 5 includes detecting (302) a failure (312) of one of the independent servers (108a) of the multi-density server (104), identifying (304) a failover target (314), determining (306) whether the failover target (314) is a non-failed independent server (108b) included in the multi-density server (104), and if the failover target (312) is a non-failed independent server (108b) included in the multi-density server (104), migrating (308) the failed independent server's (108a) workload (102a) to another server (105) that is not included in the multi-density server (104).

The method of FIG. 5 differs from the method of FIG. 3, however, in that prior to migrating (308) the failed independent server's (108a) workload (102a) to another server (105), the method of FIG. 3 includes migrating (502), by the management module (152), the failed independent server's (108a) workload (102a) to the non-failed independent server (108b) included in the multi-density server until another server (105) not included in the multi-density server (104) is available as a failover target. From time to time and for various reasons, it is possible that each server set aside in a pool of available failover targets is unavailable to be utilized as a failover target. To that end, rather than leaving the workload (102a) not executing or executing on a failed server (108a), the management module (152) may migrate (502) the workload (108a) to another independent server (108b) of the multi-density server (104) for a time. When another server becomes available as a failover target, the management module (152) may migrate (308) the workload (102a) to that server (105).

Figure 6:
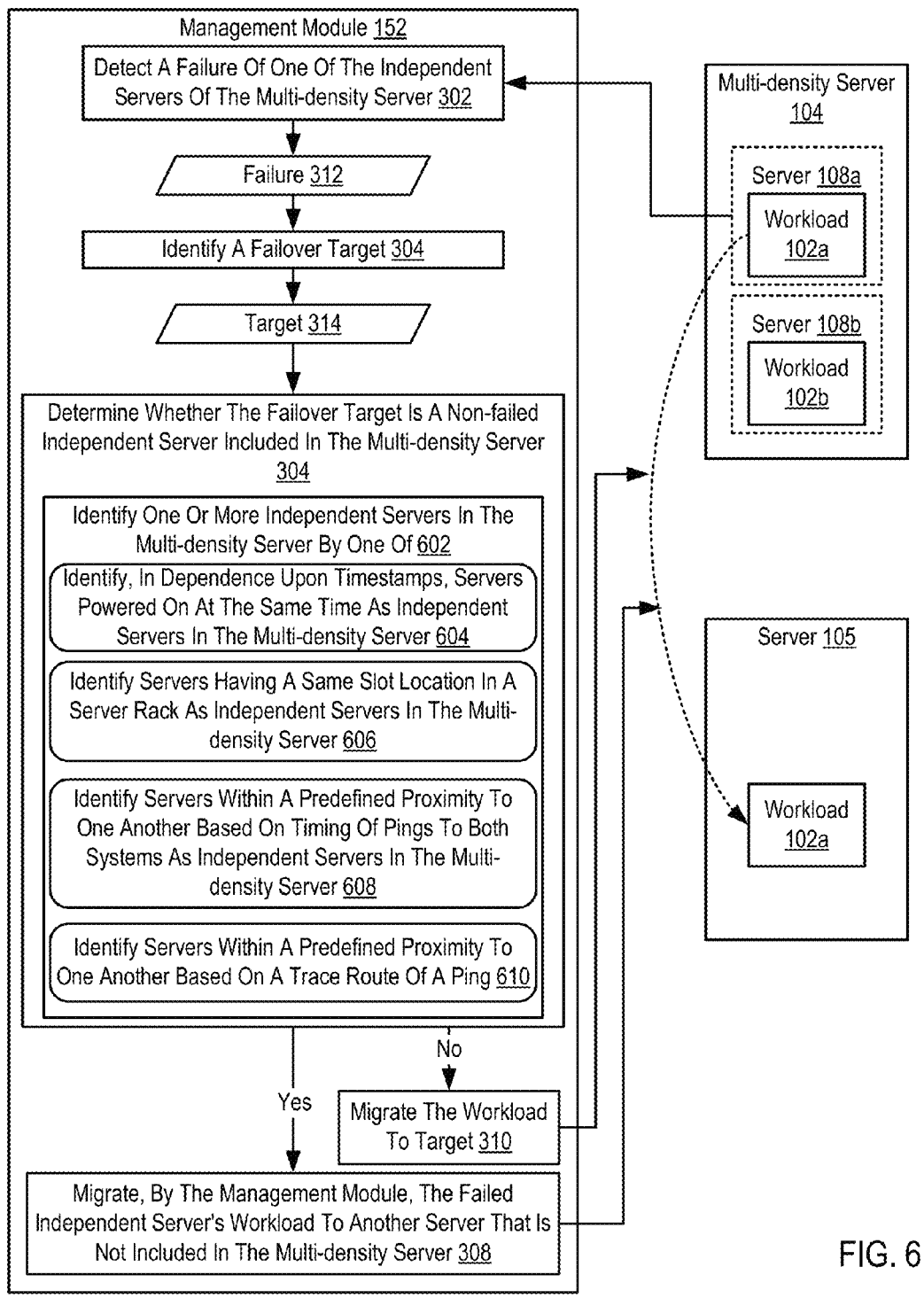
FIG. 6 sets forth a flow chart illustrating an exemplary method for failover in a data center that includes a multi-density server according to embodiments of the present invention.

For further explanation, FIG. 6 sets forth a flow chart illustrating an exemplary method for failover in a data center that includes a multi-density server according to embodiments of the present invention. The method of FIG. 6 may be carried out in a data center similar to that of FIG. 1 which includes a multi-density server similar to that of FIG. 2. The multi-density server (104) includes a plurality of independent servers (108a, 108b). The method of FIG. 6 is similar to the method of FIG. 3 in that the method of FIG. 6 includes detecting (302) a failure (312) of one of the independent servers (108a) of the multi-density server (104), identifying (304) a failover target (314), determining (306) whether the failover target (314) is a non-failed independent server (108b) included in the multi-density server (104), and if the failover target (312) is a non-failed independent server (108b) included in the multi-density server (104), migrating (308) the failed independent server's (108a) workload (102a) to another server (105) that is not included in the multi-density server (104).

The method of FIG. 6 differs from the method of FIG. 3, however, in that in the method of FIG. 6, determining (306)

whether the failover target is a non-failed independent server (108b) included in the multi-density server (104) includes identifying (602) one or more independent servers in the multi-density server. As mentioned above, a management module may not be configured with the knowledge that any particular server is a node of a multi-density server. To that end, the management module must identifying (602) those independent servers in the multi-density server (104) to determine (304) whether the failover target is included in the same multi-density server as the failed independent server (108a).

The method of FIG. 6 includes various ways to identify (602) independent servers of the multi-density server. The method of FIG. 6, for example, includes identifying (604), in dependence upon timestamps, servers powered on at the same time as independent servers in the multi-density server. Servers powered on at exactly or nearly exactly the same time may be inferred to be within the same multi-density server as such servers likely share the same server housing power supply.

The method of FIG. 6 also includes identifying (606) servers having a same slot location in a server rack as independent servers in the multi-density server. Although in some environments the management module is configured with such information in other environments, the management module may request such information from a chassis management module or the independent servers themselves.

The method of FIG. 6 also includes identifying (608) servers within a predefined proximity to one another based on timing of pings to both systems as independent servers in the multi-density server. A server may send a data communications 'ping' to one or more servers. A ping may be described in terms of the time required for a very short data communications message to be sent to a server and returned from the server. The management module may be configured to infer that two or more servers having the same or nearly the same amount of ping time are within the same multi-density server.

The method of FIG. 6 also includes identifying (610) servers within a predefined proximity to one another based on a trace route of a ping. A trace route may be utilized to count network hops, or otherwise provide network route information, between the management module and a server. By determining that two or more servers have the same or nearly the same trace routes, the management module may infer that the servers are included in the same multi-density server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of failover in a data center comprising a multi-density server, the multi-density server comprising a plurality of independent servers, the method comprising:
   detecting, by a management module, a failure of one of the independent servers of the multi-density server;
   identifying, by the management module, a failover target;
   determining, by the management module, whether the failover target is a non-failed independent server included in the multi-density server; and
   responsive to determining that the failover target is a non-failed independent server included in the multi-density server, migrating, by the management module, the failed independent server's workload to another server that is not included in the multi-density server; and
   migrating, by the management module, workload of all non-failed independent servers of the multi-density system to a server not included in the multi-density server.

2. The method of claim 1 further comprising:
   responsive to determining that the failover target is a non-failed independent server included in the multi-density server, migrating, by the management module, the failed independent server's workload to the non-failed independent server included in the multi-density server until another server not included in the multi-density server is available as a failover target.

3. The method of claim 1 wherein determining whether the failover target is a non-failed independent server included in the multi-density server further comprises identifying one or more independent servers in the multi-density server by one of:
   identifying, in dependence upon timestamps, servers powered on at the same time as independent servers in the multi-density server;
   identifying servers having a same slot location in a server rack as independent servers in the multi-density server;
   identifying servers within a predefined proximity to one another based on timing of pings to both systems as independent servers in the multi-density server; and
   identifying servers within a predefined proximity to one another based on a trace route of a ping.

4. The method of claim 1, wherein the multi-density server comprises a single rack unit form factor configured for installation into a single slot of a server chassis.

5. The method of claim 4, wherein the multi-density server comprises a blade form factor for a single slot of a blade server chassis.

* * * * *